(12) United States Patent
Staffa et al.

(10) Patent No.: US 11,618,366 B1
(45) Date of Patent: Apr. 4, 2023

(54) EXOTIC DANCE CLUB TRAILER

(71) Applicants: Kutitia Staffa, Tamarac, FL (US); Clint Coutain, Tamarac, FL (US)

(72) Inventors: Kutitia Staffa, Tamarac, FL (US); Clint Coutain, Tamarac, FL (US)

( * ) Notice: Subject to any disclaimer, the term of this patent is extended or adjusted under 35 U.S.C. 154(b) by 67 days.

(21) Appl. No.: 17/385,136

(22) Filed: Jul. 26, 2021

(51) Int. Cl.
*B60P 3/025* (2006.01)

(52) U.S. Cl.
CPC .......... *B60P 3/0252* (2013.01); *B60P 3/0257* (2013.01)

(58) Field of Classification Search
CPC .......... B60P 3/0252; B60P 3/0257; B60P 3/36
USPC ............................................. 296/24.36, 24.4
See application file for complete search history.

(56) References Cited

U.S. PATENT DOCUMENTS

| | | | |
|---|---|---|---|
| 4,601,509 A | 7/1986 | Ellis, Sr. | |
| 4,666,204 A | 5/1987 | Reinholtz | |
| 5,706,616 A | 1/1998 | Fernandez | |
| 9,358,179 B2 | 6/2016 | Fernandez et al. | |
| 2005/0189785 A1* | 9/2005 | Harder | B60P 3/34 |
| | | | 296/171 |
| 2007/0174139 A1 | 7/2007 | Brock | |
| 2010/0201146 A1 | 8/2010 | Alexander | |
| 2013/0033057 A1 | 2/2013 | Markham | |
| 2019/0118693 A1 | 4/2019 | Vandervelde | |
| 2021/0347289 A1* | 11/2021 | Terry | B62D 63/06 |

FOREIGN PATENT DOCUMENTS

| | | | |
|---|---|---|---|
| ES | 2409081 | | 6/2013 |
| ES | 1260019 U | * | 2/2021 |
| KR | 20200103903 A | * | 9/2020 |

\* cited by examiner

*Primary Examiner* — Dennis H Pedder
*Assistant Examiner* — Kevin P Weldon
(74) *Attorney, Agent, or Firm* — Kyle A. Fletcher, Esq.

(57) ABSTRACT

The exotic dance club trailer comprises a towed vehicle that may be operable as an exotic dance club. The towed vehicle may be subdivided into a dance salon, a dressing room, a bar area, one or more restrooms, and an entry hall. The dressing room may be adapted for one or more dancers to change clothing. The dance salon may be adapted for the one or more dancers to perform in front of one or more patrons. The bar area may be adapted for the preparation and serving of beverages. The towed vehicle may be adapted to be moved between venues by a tow vehicle in order to maximize access to the one or more patrons. The one or more restrooms may be located at the front of the towed vehicle in order to make effective use of an aerodynamically shaped area of the towed vehicle.

18 Claims, 3 Drawing Sheets

EXOTIC DANCE CLUB TRAILER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of mobile facilities, more specifically, an exotic dance club trailer.

SUMMARY OF INVENTION

The exotic dance club trailer comprises a towed vehicle that may be operable as an exotic dance club. The towed vehicle may be subdivided into a dance salon, a dressing room, a bar area, one or more restrooms, and an entry hall. The dressing room may be adapted for one or more dancers to change clothing. The dance salon may be adapted for the one or more dancers to perform in front of one or more patrons. The bar area may be adapted for the preparation and serving of beverages. The towed vehicle may be adapted to be moved between venues by a tow vehicle in order to maximize access to the one or more patrons. The one or more restrooms may be located at the front of the towed vehicle in order to make effective use of an aerodynamically shaped area of the towed vehicle.

An object of the invention is to provide a towed vehicle that may be moved between venues.

Another object of the invention is to provide a towed vehicle that comprising internal division that are operate as a dressing room, dance salon, bar area, entry hall, and one or more restrooms.

A further object of the invention is to provide a fresh water tank, and at least one waste tank.

Yet another object of the invention is to provide a fuel tank and a generator that are operable to provide a source of electricity for operating lighting, one or more HVAC, exhaust fans, and a sound system.

These together with additional objects, features and advantages of the exotic dance club trailer will be readily apparent to those of ordinary skill in the art upon reading the following detailed description of the presently preferred, but nonetheless illustrative, embodiments when taken in conjunction with the accompanying drawings.

In this respect, before explaining the current embodiments of the exotic dance club trailer in detail, it is to be understood that the exotic dance club trailer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the exotic dance club trailer.

It is therefore important that the claims be regarded as including such equivalent construction insofar as they do not depart from the spirit and scope of the exotic dance club trailer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
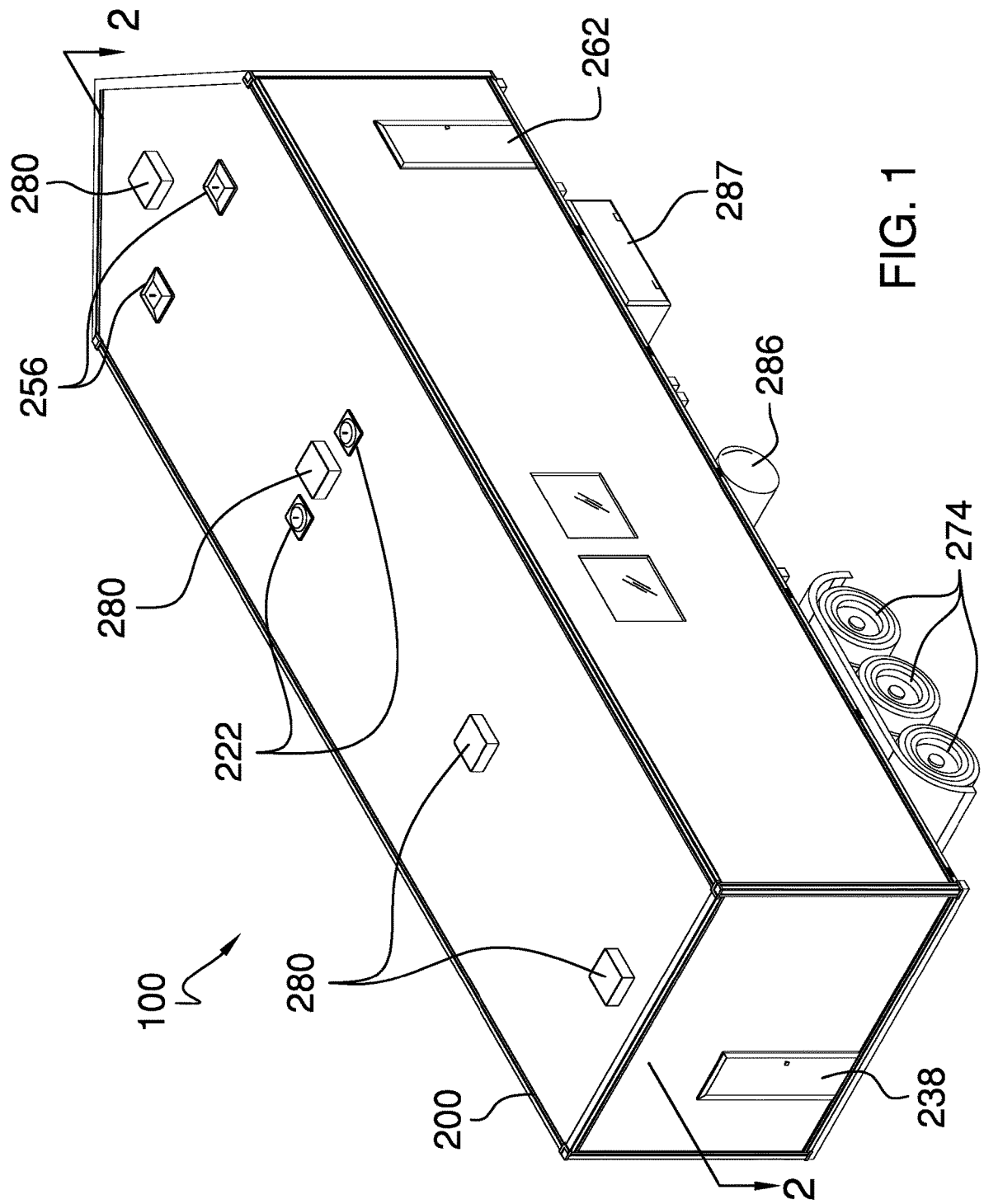
FIG. 1 is an isometric view of an embodiment of the disclosure.
Figure 2:
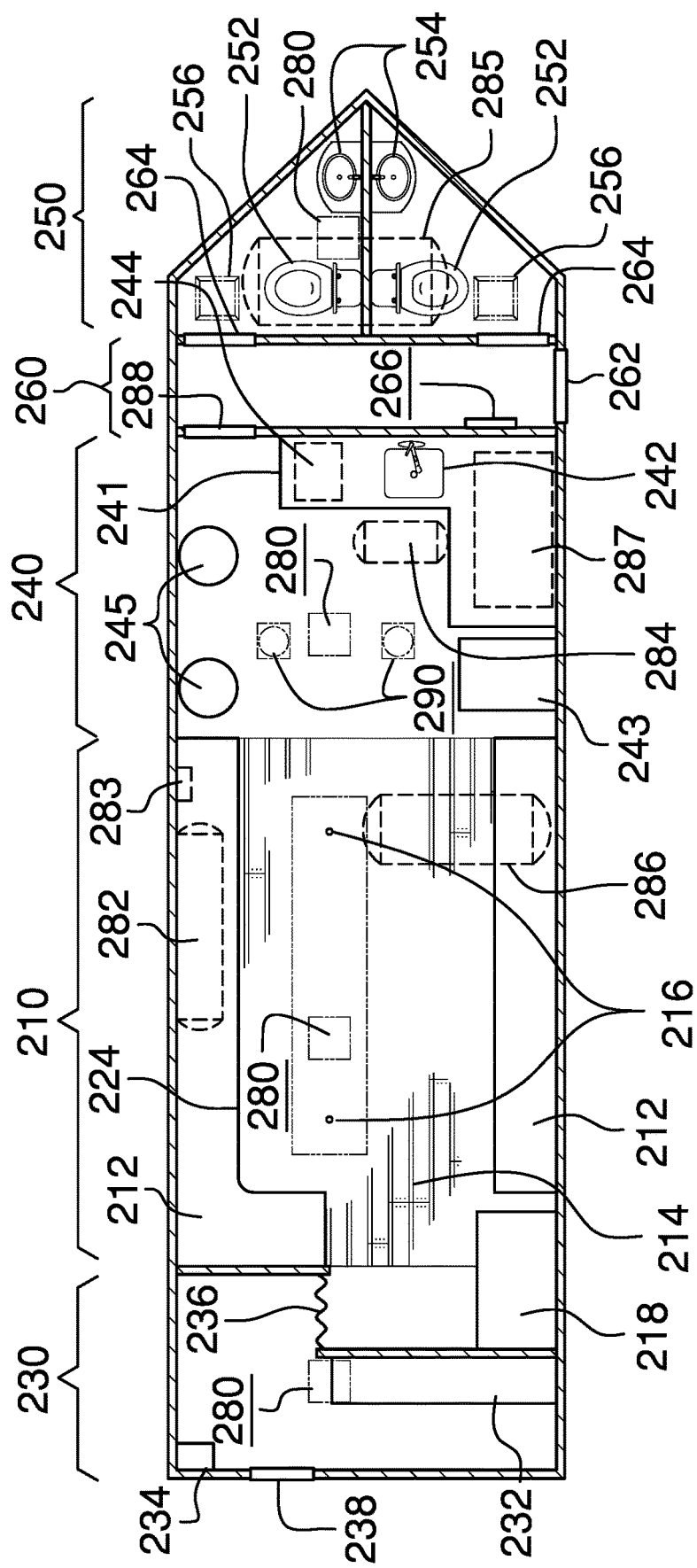
FIG. 2 is a top view of an embodiment of the disclosure.
Figure 3:
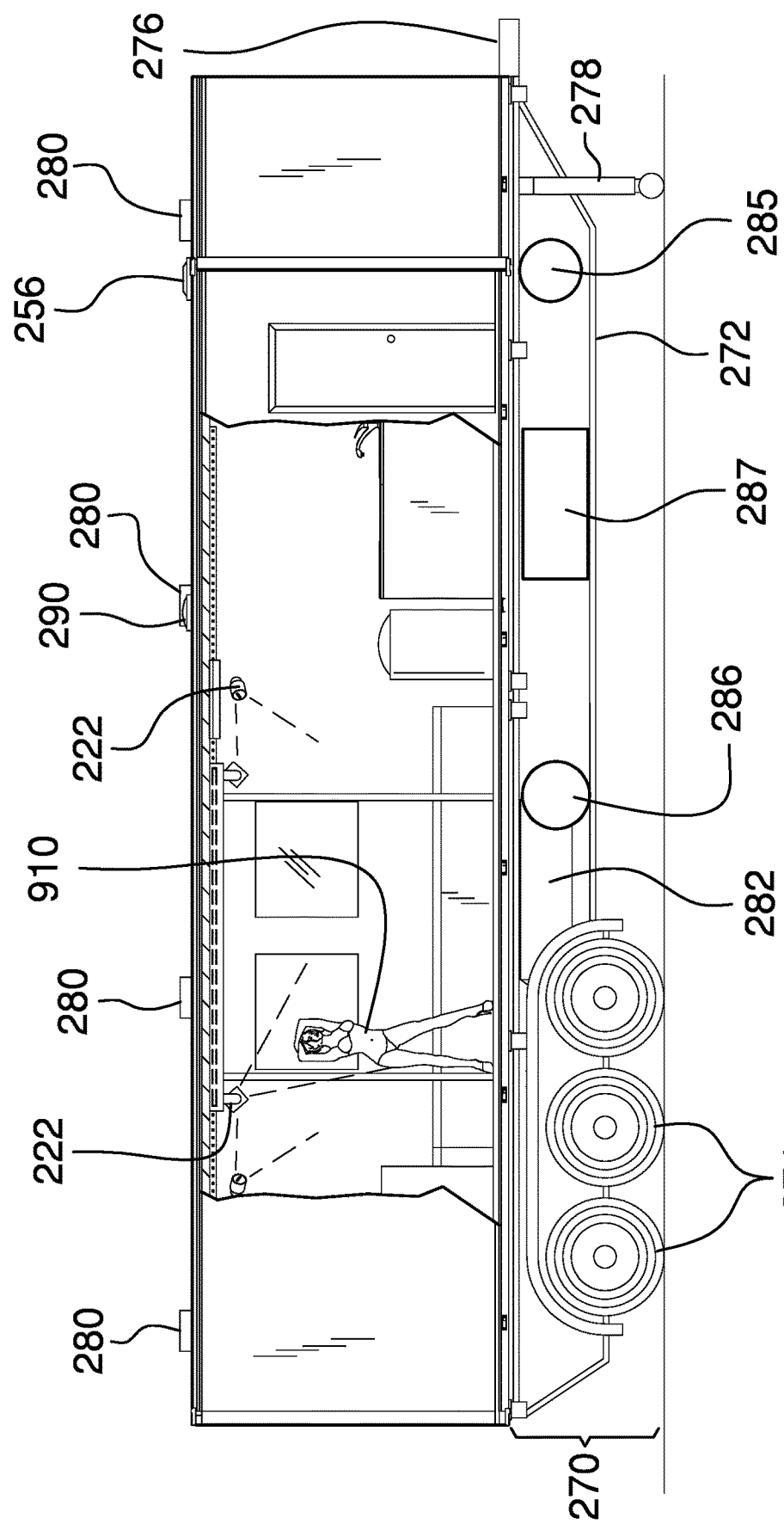
FIG. 3 is a side view of an embodiment of the disclosure.

Detailed reference will now be made to a first potential embodiment of the disclosure, which is illustrated in FIGS. 1 through 3.

The exotic dance club trailer 100 (hereinafter invention) comprises a towed vehicle 200 that may be operable as an exotic dance club. The towed vehicle 200 may be subdivided into a dance salon 210, a dressing room 230, a bar area 240, one or more restrooms 250, and an entry hall 260. The dressing room 230 may be adapted for one or more dancers 910 to change out of street clothes. The dance salon 210 may be adapted for the one or more dancers 910 to perform in front of one or more patrons. The bar area 240 may be adapted for the preparation and serving of beverages to the one or more patrons. The towed vehicle 200 may be adapted to be moved between venues by a tow vehicle in order to maximize access to the one or more patrons. The one or more restrooms 250 may be located at the front of the towed vehicle 200 in order to make effective use of an aerodynamically shaped front area of the towed vehicle 200.

The dance salon 210 may comprise one or more seating areas 212, a dance floor 214, and a DJ area 218. The dance salon 210 may be adapted to provide a location where the one or more patrons watch the one or more dancers 910 perform. The one or more seating areas 212 may be adapted to provide the one or more patrons with a comfortable place to sit while watching the one or more dancers 910. The one or more seating areas 212 may be cushioned.

The dance floor 214 may be adapted for the one or more dancers 910 to perform dance routines. The dance floor 214 may comprise one or more dance poles 216 and a mirrored ceiling 224. The one or more dance poles 216 may be adapted for the one or more dancers 910 to incorporate into the dance routines. As non-limiting examples, the one or more dancers 910 may spin around the one or more dance poles 216, climb the one or more dance poles 216, hang from the one or more dance poles 216, and/or perform other athletic movements involving the one or more dance poles 216. In some embodiments, the dance floor 214 may be wooden. The mirrored ceiling 224 may be a reflective surface coupled to the ceiling above the dance floor 214. As non-limiting examples, the mirrored ceiling 224 may reflect theatrical lighting 222 in the dance salon 210, may provide the one or more patrons with a view of the one or more dancers 910 from a different vantage point, or both.

The DJ area 218 may be adapted to provide a DJ with access to controls for a sound system, controls for the theatrical lighting 222, or both. The sound system may provide music for the one or more dancers 910 to dance to. The theatrical lighting may provide lighting effects within the dance salon 210 and/or the bar area 240.

The dressing room 230 may comprise one or more dressing room tables 232, one or more lockers 234, a privacy curtain 236, and a private entry/exit door 238. The dressing room 230 may be adapted to provide the one or more dancers 910 with a private area for changing clothing and/or applying makeup. The one or more dressing room tables 232 may be adapted to provide the one or more dancers 910 with a work surface. As non-limiting examples, the one or more dancers 910 may use the one or more dressing room tables 232 while applying cosmetics, brushing hair, adjusting dance costumes, and the like. In some embodiments, the one or more dressing room tables 232 may provide a makeup mirror and makeup lighting. The one or more lockers 234 may be adapted to provide the one or more dancers with storage for personal items. The privacy curtain 236 may be adapted to provide privacy to the one or more dancers 910 by blocking the view from the dance salon 210. The private entry/exit door 238 may be adapted to provide external access to the dressing room 230 for the one or more dancers 910.

The bar area 240 may comprise a bar top 241, a bar sink 242, one or more beverage coolers 243, one or more ice makers 244, and one or more bar tables 245. The bar area 240 may be a wet bar that is adapted for the preparation and serving of the beverages for the one or more patrons. The bar top 241 and the bar sink 242 may be adapted to provide a work area for a bartender. The one or more beverage coolers 243 may provide storage for chilled beverages. The one or more ice makers 244 may be mounted beneath the bar top 241 and may provide a source of ice for the beverages. The one or more bar tables 245 may provide a place for the one or more patrons to place the beverages while standing in the bar area 240.

The one or more restrooms 250 may be adapted to provide sanitary facilities for the one or more patrons and staff. Each of the one or more restrooms 250 may comprise a toilet 252 and a restroom sink 254. Each of the one or more restrooms 250 may further comprise a restroom exhaust fan 256 to remove odors.

The entry hall 260 may be adapted to provide the one or more patrons with access to the towed vehicle 200 via a main entry/exit door 262. The entry hall 260 may be further adapted provide access to the one or more restrooms 250 via one or more restroom doors 264. A bar door 288 may be adapted to provide the one or more patrons with access to the bar area 240 from the entry hall 260. The entry hall 260 may be adapted to provide access to an electrical panel 266.

The towed vehicle 200 may comprise an undercarriage 270. The undercarriage 270 may comprise at least a frame 272, a plurality of wheels 274, and a tow coupling 276. The frame 272 may provide structural support for the towed vehicle 200. The plurality of wheels 274 may enable the towed vehicle 200 to move easily over a road. The tow coupling 276 may be adapted to couple the towed vehicle 200 to the tow vehicle. A landing gear may be one or more deployable legs located at the front of the towed vehicle 200 to hold the towed vehicle 200 level when decoupled from the tow vehicle.

A diesel generator 287 may provide electricity to operate overhead lighting, one or more HVAC units 280, the sound system, the theatrical lighting 222, the one or more beverage coolers 243, the one or more ice makers 244, the restroom exhaust fans 256, outlets, or combinations thereof. The electricity generated by the diesel generator 287 may be distributed throughout the towed vehicle 200 by the electrical panel 266. A fuel tank 286 mounted within the undercarriage 270 may provide diesel fuel for use by the diesel generator 287. In a preferred embodiment, the capacity of the fuel tank 286 may be 50.0+/−10.0 gallons. In some embodiments, the invention 100 may comprise one or more power cables to couple to an A/C power grid when available such that use of the diesel generator 287 may not be necessary.

The undercarriage 270 may comprise a fresh water tank 282 for storing potable water and a water pump 283 for pumping the water out of the fresh water tank 282. The fresh water tank 282 and the water pump 283 may provide water to the bar sink 242, to the one or more ice makers 244, to the restroom sinks 254, to the toilets 252, or combinations thereof. In a preferred embodiment, the fresh water tank 282 may have a capacity of 35.0 to 50.0 gallons.

The undercarriage 270 may comprise a first waste tank 284 for collecting used water from the bar sink 242. The undercarriage 270 may further comprise a second waste tank 285 for collecting effluent from the toilets 252 and from the restroom sinks 254. The first waste tank 284 and the second waste tank 285 may be emptied when the towed vehicle 200 is adjacent to a dumping facility. In a preferred embodiment, the first waste tank 284 may have a capacity of 14.0 gallons+/−2.0 gallons and the second waste tank 285 may have a capacity of 31.0 gallons+/−5.0 gallons.

The towed vehicle 200 may further comprise the one or more HVAC units 280 adapted to provide heating and/or cooling to the interior of the towed vehicle 200 via one or more ceiling vents. In embodiments, equipment comprising the one or more HVAC units may be built into the undercarriage 270, located on the roof of the towed vehicle 200, hidden within interior spaces, such as within cavities under the one or more seating areas 212, or combinations thereof.

In some embodiments, the towed vehicle 200 may comprise one or more ceiling exhaust fans 290 to circulate air and/or remove smoke.

In use, the towed vehicle 200 may be towed to the venue, the landing gear 278 may be deployed, and the tow vehicle may be decoupled from the towed vehicle 200. Alternatively, the tow vehicle may remain coupled to support the front of the towed vehicle 200 while the towed vehicle 200 is in use. The diesel generator 287 may be started to supply electricity within the towed vehicle 200. Alternatively, if the A/C power grid is accessible at the venue, power cables may be run from the towed vehicle 200 to one or more electrical hookups.

One or more patrons may enter the towed vehicle 200 via the main entry/exit door 262. The one or more patrons may be directed through the entry hall 260 to the bar door 288 and into the bar area 240. One or more restrooms 250 may be available off of the entry hall 260 for the one or more patrons to use at any time. The one or more patrons may pass through the bar area 240 to the dance salon 210 and may be seated at one or more seating areas 212. The one or more patrons may purchase a beverage as they pass through the bar area 240 or may return to the bar area 240 later to purchase the beverages. Beverages may also be offered to the one or more patrons as they sit and watch dance routines.

One or more dancers 910 may enter the dressing room 230 directly via the private entry/exit door 238. The one or more dancers 910 may change out of street clothing and may store personal items in the one or more lockers 234 provided. The one or more dancers 910 may enter the dance salon 210 through the privacy curtain 236 that separates the dressing room 230 from the dance salon 210. A DJ may start music playing through the sound system from the DJ area 218. The DJ may also be able to control the theatrical lighting 222 in the dance salon 210 and/or the bar area 240 from the DJ area 218. One or more dancers 910 may perform dance routines on the dance floor 214 using the one or more dance poles 216 as required.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", may refer to connecting, either directly or indirectly, and does not necessarily imply a mechanical connection.

As used herein, "front" may indicate the side of an object that is closest to a forward direction of travel under normal use of the object or the side or part of an object that normally presents itself to view or that is normally used first. "Rear" or "back" may refer to the side that is opposite the front.

In this disclosure, a "generator" may refer to a device that converts rotational mechanical energy into electric energy.

As used in this disclosure, "HVAC" may be an acronym for Heating Ventilation and Air Conditioning and is a general term that refers to the air handling technology used within buildings. As used herein, "HVAC" equipment may heat air, chill air, recirculate air, or combinations thereof.

As used in this disclosure, the word "interior" may be used as a relational term that implies that an object is located or contained within the boundary of a structure or a space.

As used in this disclosure, a "pump" may be a mechanical or electromechanical device that uses suction or pressure to raise or move fluids, compress fluids, or force a fluid into an inflatable object. As non-limiting examples, fluids may include both liquids, such as water, and gases, such as air.

As used in this disclosure, the term "tow" may be used as a verb that refers to moving an object by pulling on the object with the assistance of an apparatus or device.

As used herein, a "tow vehicle" may be a vehicle that is used to tow another vehicle.

As used herein, a "towed vehicle" may be a vehicle that is being pulled by a tow vehicle.

As used in this disclosure, a "trailer" may be an unpowered wheeled vehicle that is towed by a powered vehicle.

With respect to the above description, it is to be realized that the optimum dimensional relationship for the various components of the invention described above and in FIGS. 1 through 3, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An exotic dance club trailer comprising:
a towed vehicle that is operable as an exotic dance club;
wherein the towed vehicle is subdivided into a dance salon, a dressing room, a bar area, one or more restrooms, and an entry hall;
wherein the dressing room is adapted for one or more dancers to change clothing;
wherein the dance salon is adapted for the one or more dancers to perform in front of one or more patrons;
wherein the bar area is adapted for the preparation and serving of beverages to the one or more patrons;
wherein the towed vehicle is adapted to be moved between venues by a tow vehicle;
wherein the one or more restrooms are located at the front of the towed vehicle in order to make use of an aerodynamically shaped area of the towed vehicle;
wherein the dance salon comprises one or more seating areas, a dance floor, and a DJ area;
wherein the dance salon is adapted to provide a location where the one or more patrons watch the one or more dancers perform;
wherein the one or more seating areas are adapted to provide the one or more patrons with a place to sit while watching the one or more dancers;
wherein the dance floor is adapted for the one or more dancers to perform dance routines;
wherein the dance floor comprises one or more dance poles and a mirrored ceiling;
wherein the one or more dance poles are adapted for the one or more dancers to incorporate into the dance routines;

wherein the mirrored ceiling is a reflective surface coupled to the ceiling above the dance floor.

2. The exotic dance club trailer according to claim 1 wherein the one or more seating areas are cushioned.

3. The exotic dance club trailer according to claim 1 wherein the dance floor is wooden.

4. The exotic dance club trailer according to claim 1 wherein the DJ area is adapted to provide a DJ with access to controls for a sound system, controls for theatrical lighting, or both;
wherein the sound system provides music for the one or more dancers to dance to;
wherein the theatrical lighting provides lighting effects within the dance salon and/or the bar area.

5. The exotic dance club trailer according to claim 4 wherein the dressing room comprises one or more dressing room tables, one or more lockers, a privacy curtain, and a private entry/exit door;
wherein the dressing room is adapted to provide the one or more dancers with a private area for changing clothing and/or applying makeup;
wherein the one or more dressing room tables are adapted to provide the one or more dancers with a work surface;
wherein the one or more lockers are adapted to provide the one or more dancers with storage for personal items;
wherein the privacy curtain is adapted to provide privacy to the one or more dancers by blocking a view from the dance salon;
wherein the private entry/exit door is adapted to provide external access to the dressing room for the one or more dancers.

6. The exotic dance club trailer according to claim 5 wherein the bar area comprises a bar top, a bar sink, one or more beverage coolers, one or more ice makers, and one or more bar tables;
wherein the bar area is a wet bar that is adapted for the preparation and serving of the beverages for the one or more patrons;
wherein the bar top and the bar sink are adapted to provide a work area for a bartender;
wherein the one or more beverage coolers provide storage for chilled beverages;
wherein the one or more ice makers are mounted beneath the bar top and provide a source of ice;
wherein the one or more bar tables provide a place for the one or more patrons to place the beverages while standing in the bar area.

7. The exotic dance club trailer according to claim 6 wherein the one or more restrooms are adapted to provide sanitary facilities for the one or more patrons and staff;
wherein each of the one or more restrooms comprise a toilet and a restroom sink;
wherein each of the one or more restrooms further comprise a restroom exhaust fan to remove odors.

8. The exotic dance club trailer according to claim 7 wherein the entry hall is adapted to provide the one or more patrons with access to the towed vehicle via a main entry/exit door;
wherein the entry hall is further adapted provide access to the one or more restrooms via one or more restroom doors;
wherein a bar door is adapted to provide the one or more patrons with access to the bar area from the entry hall;
wherein the entry hall is adapted to provide access to an electrical panel.

9. The exotic dance club trailer according to claim 8 wherein the towed vehicle comprises an undercarriage;
wherein the undercarriage comprises at least a frame, a plurality of wheels, and a tow coupling;
wherein the frame provides structural support for the towed vehicle;
wherein the plurality of wheels enable the towed vehicle to move over a road;
wherein the tow coupling is adapted to couple the towed vehicle to the tow vehicle;
wherein a landing gear is one or more deployable legs located at the front of the towed vehicle to hold the towed vehicle level when decoupled from the tow vehicle.

10. The exotic dance club trailer according to claim 9 wherein a diesel generator provides electricity to operate overhead lighting, one or more HVAC units, the sound system, the theatrical lighting, the one or more beverage coolers, the one or more ice makers, the restroom exhaust fans, outlets, or combinations thereof;
wherein the electricity generated by the diesel generator is distributed throughout the towed vehicle by the electrical panel;
wherein a fuel tank mounted within the undercarriage provides diesel fuel for use by the diesel generator.

11. The exotic dance club trailer according to claim 10 wherein the capacity of the fuel tank is 50.0+1-10.0 gallons.

12. The exotic dance club trailer according to claim 10 wherein the exotic dance club trailer comprises one or more power cables to couple to an A/C power grid when available such that use of the diesel generator is not necessary.

13. The exotic dance club trailer according to claim 10 wherein the undercarriage comprises a fresh water tank for storing potable water and a water pump for pumping the water out of the fresh water tank;
wherein the fresh water tank and the water pump provide water to the bar sink, to the one or more ice makers, to the restroom sinks, to the toilets, or combinations thereof.

14. The exotic dance club trailer according to claim 13 wherein the fresh water tank has a capacity of 35.0 to 50.0 gallons.

15. The exotic dance club trailer according to claim 13 wherein the undercarriage comprises a first waste tank for collecting used water from the bar sink;
wherein the undercarriage further comprises a second waste tank for collecting effluent from the toilets and from the restroom sinks;
wherein the first waste tank and the second waste tank are operable to be emptied when the towed vehicle is adjacent to a dumping facility.

16. The exotic dance club trailer according to claim 15 wherein the first waste tank has a capacity of 14.0 gallons+/−2.0 gallons and the second waste tank has a capacity of 31.0 gallons+/−5.0 gallons.

17. The exotic dance club trailer according to claim 15 wherein the towed vehicle further comprises the one or more HVAC units adapted to provide heating and/or cooling to the interior of the towed vehicle via one or more ceiling vents.

18. The exotic dance club trailer according to claim 17 wherein the towed vehicle comprises one or more ceiling exhaust fans to circulate air and/or remove smoke.

* * * * *